(12) United States Patent
Nersisyan et al.

(10) Patent No.: US 10,776,352 B2
(45) Date of Patent: Sep. 15, 2020

(54) GENERIC QUERY LANGUAGE FOR DATA STORES

(71) Applicant: HEWLETT PACKARD ENTERPRISE DEVELOPMENT LP, Houston, TX (US)

(72) Inventors: Roman Nersisyan, Palo Alto, CA (US); Yung-Ching Tseng, Palo Alto, CA (US); Sandeep Gangadharan, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 172 days.

(21) Appl. No.: 15/365,613

(22) Filed: Nov. 30, 2016

(65) Prior Publication Data

US 2018/0150526 A1  May 31, 2018

(51) Int. Cl.
*G06F 16/242* (2019.01)
*G06F 16/2452* (2019.01)

(52) U.S. Cl.
CPC ........ *G06F 16/244* (2019.01); *G06F 16/2452* (2019.01)

(58) Field of Classification Search
CPC ......... G06F 17/30427; G06F 17/30412; G06F 16/244; G06F 16/2452
See application file for complete search history.

(56) References Cited

U.S. PATENT DOCUMENTS

| | | | |
|---|---|---|---|
| 5,924,103 A * | 7/1999 | Ahmed | G06F 17/30371 |
| 6,795,825 B2 | 9/2004 | Rishe | |
| 6,957,214 B2 | 10/2005 | Silberberg et al. | |
| 7,702,649 B1 | 4/2010 | Bresch et al. | |
| 7,797,304 B2 | 9/2010 | Muralidhar et al. | |
| 7,881,957 B1 * | 2/2011 | Cohen | G06Q 30/08 |
| 2002/0120616 A1 * | 8/2002 | Yun | G06F 16/3347 |
| 2006/0195460 A1 | 8/2006 | Nori et al. | |
| 2007/0219863 A1 * | 9/2007 | Park | G06Q 10/10 705/14.11 |

(Continued)

FOREIGN PATENT DOCUMENTS

WO    WO 2004/044785 A1    5/2004

OTHER PUBLICATIONS https://docs.oracle.com/javaee/5/tutorial/doc/javaeetutorial5.pdf (Year: 2010).*
https://www.siteground.com/tutorials/phpmyadmin/query/ (2015 version) https://www.phpmyadmin.net/files/4.5.0/ (Year: 2015).*
Gallagher, et al; The Data Access Protocol—DAP 2.0; 21See RFC 2616, Section 19.3 'Tolerant Applications'; Oct. 10, 2007.

(Continued)

*Primary Examiner* — Tarek Chbouki
*Assistant Examiner* — Maher N Algibhah
(74) *Attorney, Agent, or Firm* — Hewlett Packard Enterprise Patent Department

(57) ABSTRACT

In some examples, a method includes constructing, by a computing device, a plurality of expressions using a generic query language that is independent of implementation of an associated data store, the associated data store supporting a plurality of operands comprising at least one comparison operand and multiple logical operands; generating, by the computing device, a single query including the plurality of expressions to the associated data store, wherein the plurality of expressions are connected using the multiple logical operands; transmitting, by the computing device, the single query to the associated data store; and receiving, by the computing device, a single set of results corresponding to the single query.

15 Claims, 8 Drawing Sheets

(56) References Cited

U.S. PATENT DOCUMENTS

| | | | | |
|---|---|---|---|---|
| 2010/0145946 | A1* | 6/2010 | Conrad | G06F 16/2452 707/736 |
| 2010/0169381 | A1* | 7/2010 | Faunce | G06F 17/30448 707/797 |
| 2011/0167063 | A1* | 7/2011 | Tengli | G06F 7/00 707/737 |
| 2013/0024788 | A1* | 1/2013 | Olsen | G06Q 10/10 715/753 |
| 2013/0318117 | A1* | 11/2013 | Mohamad Abdul | G06F 16/1748 707/769 |
| 2014/0082013 | A1* | 3/2014 | Wolf | G06F 16/2453 707/769 |
| 2014/0374276 | A1* | 12/2014 | Guthrie | G01N 33/48792 205/777.5 |
| 2015/0074034 | A1* | 3/2015 | Ait-Mohktar | G06F 16/835 706/50 |
| 2015/0365359 | A1* | 12/2015 | Hasan | H04L 51/04 709/206 |
| 2016/0299947 | A1* | 10/2016 | Pangeni | G06F 16/24545 |
| 2016/0350091 | A1* | 12/2016 | Khot | G06F 8/51 |
| 2017/0031976 | A1* | 2/2017 | Chavan | G06F 16/2453 |
| 2018/0314736 | A1* | 11/2018 | Fink | G06F 21/53 |

OTHER PUBLICATIONS

Ghislain Fourney; JSONiq; The SQL of NoSQL; http://www.jsoniq.org/ Nov. 21, 2016.
HTSQL; HTSQL Tutorial, A query language for the accidental programmer; http://htsql.org/doc/tutorial.html.
Oracle, "Query Building Basics," 2004, pp. 1-11, Oracle® Application Server TopLink Application Developer's Guide, Oracle, Available at: <docs.oracle.com/cd/B14099_19/web.1012/b15901/queries002.htm>.
Webstore; webstore: tables on the web; http://webstore.readthedocs.io/en/latest/ Nov. 21, 2016.
Couchbase, "NoSQL Database", available online at <http://www.couchbase.com/>, Nov. 26, 2016, 6 pages
Elasticsearch, "Open Source Search & Analytics", available online at <https://web.archive.org/web/20161109135534/https://www.elastic.co/>, Nov. 9, 2016, 5 pages.
M. Nottingham, "FIQL: The Feed Item Query Language draft-nottingham-atompub-fiql-00", Network Working Group, Internet-Draft, available online at <https://tools.ietf.org/pdf/draft-nottingham-atompub-fiql-00.pdf>, Dec. 12, 2007, 16 pages.
Google Charts, "Query Language Reference (Version 0.7)", available online at <https://web.archive.org/web/20160916060133/https://developers.google.com/chart/interactive/docs/querylanguage>, Sep. 16, 2016, 21 pages.

* cited by examiner

| FIRST NAME 210 | LAST NAME 220 | VISITED STATES 230 |
|---|---|---|
| John | Thomas | Alabama, Nevada, New Jersey, Nebraska |
| Kevin | Thompson | Alaska, New Mexico, South Dakota |
| John | Thomberg | Nebraska, South Carolina, New York |
| Johnathan | Smith | Alabama, New Hampshire, Ohio |
| Fred | Brown | Alabama, Oregon |

*FIG. 2A*

| QUERY 240 | (#FirstName#Equal#John) |
|---|---|
| RESULT 250 | John Thomas, John Thomberg |

*FIG. 2B*

| QUERY 260 | (#FirstName#Equal#John,Kevin) |
|---|---|
| RESULT 270 | John Thomas, John Thomberg, Kevin Thompson |

*FIG. 2C*

| QUERY 280 | (#FirstName#Equal#John,Kevin)&(#LastName#like#Thom%) |
|---|---|
| RESULT 290 | John Thomas, John Thomberg, Kevin Thompson |

*FIG. 2D*

| QUERY 310 | (#VisitedStates#Contains#Alabama) |
|---|---|
| RESULT 320 | John Thomas, Johnathan Smith, Fred Brown |

*FIG. 3A*

| QUERY 330 | (#VisitedStates#Contains#Alabama,Nebraska) |
|---|---|
| RESULT 340 | John Thomas, Johnathan Smith, Fred Brown, John Thomberg |

*FIG. 3B*

| QUERY 350 | (#VisitedStates#Contains#Alabama&Nebraska) |
|---|---|
| RESULT 360 | John Thomas, John Thomberg |

*FIG. 3C*

| QUERY 370 | (#VisitedStates#Contains#!Alabama&!Nebraska) |
|---|---|
| RESULT 375 | Kevin Thompson |

*FIG. 3D*

| QUERY 380 | (#VisitedStates#Contains#New%&!South%) |
|---|---|
| RESULT 385 | John Thomas, Johnathan Smith |

*FIG. 3E*

| QUERY 390 | (#VisitedStates#Equal#Alabama&Oregon) |
|---|---|
| RESULT 395 | Fred Brown |

*FIG. 3F*

GENERIC QUERY LANGUAGE FOR DATA STORES

BACKGROUND

There is a tendency in data store industry to have simplified queries. NoSQL data stores has brought new capabilities to store, scale and perform well on queries. Also, NoSQL has brought new query languages. For example, a document-based data store may have its own query language; a distributed cache may have its own declared N1SQL language; etc. Thus, data store vendors generally try to bring new query mechanisms that are as simple as possible. These new query mechanisms would allow users to create complex queries by using simple query syntax. Generally, data store implementations may come with its own query language to be used on the client side. However, the query language is specific to the implementation of the data store and the client-side applications.

BRIEF DESCRIPTION OF THE DRAWINGS

The following detailed description references the drawings, wherein:

FIGS. 2A-2D are block diagrams illustrating example queries generated using the generic query language for data stores;

FIGS. 3A-3F are block diagrams illustrating more example queries generated using the generic query language for data stores;

DETAILED DESCRIPTION

Data store implementations may come with its own query language to be used by the clients of the data store. Those query languages often are limited to the implementation of the data store. For example, the use of specific query language may be allowed from a limited client base, e.g., JAVA-based clients. As another example, some data stores may allow queries based on a Representational State Transfer (REST) Application Programming Interface (API) by putting query string in Uniform Resource Identifier (URI) query parameter or a JavaScript Object Notation (JSON) body. This capability adds many opportunities for data stores to be useful in such a trending design pattern as a microservice architecture, where communication is based on the REST API.

The generic URI query language described herein can provide a simple way to create complex queries by being independent from the underlying data store and storing mechanisms. Specifically, this generic query language can provide an easy way of representing a full set of variations of queries, especially in many-to-many and one-to-many relationships. The generic query language would need support for a basic set of operations by the data stores. For example, the underlying database needs to provide a set of basic query operations (e.g., "equal," "not equal," "greater than," "less than," etc.) and a set of query aggregation operations (e.g., "or," "and," "not," etc.). Moreover, the generic query language may be extended if the underlying data store has additional query capabilities.

According to the present disclosure, the mechanism to store many-to-many relationships in the data stores could vary depending on a plurality of data store characteristics. For example, for Structured Query Language (SQL) based data stores, associative tables can be used to store the many-to-many relationships. On the other hand, for NoSQL data stores, other options may be used.

At least two approaches can be used to store many-to-many relationships for key-value (object) data stores. These approaches can apply to cases where mostly READ or WRITE operations are frequent but update operation. One approach in SQL-based data stores, when on one side of a many-to-many relationship, is using a simple type represented as a string and data can be stored in de-normalized form. However, by storing with associative tables, query performance can be higher. Nevertheless, the generic query language described herein is not coupled with the design or implementation of the underlying storing mechanism.

Architecture

Figure 1:
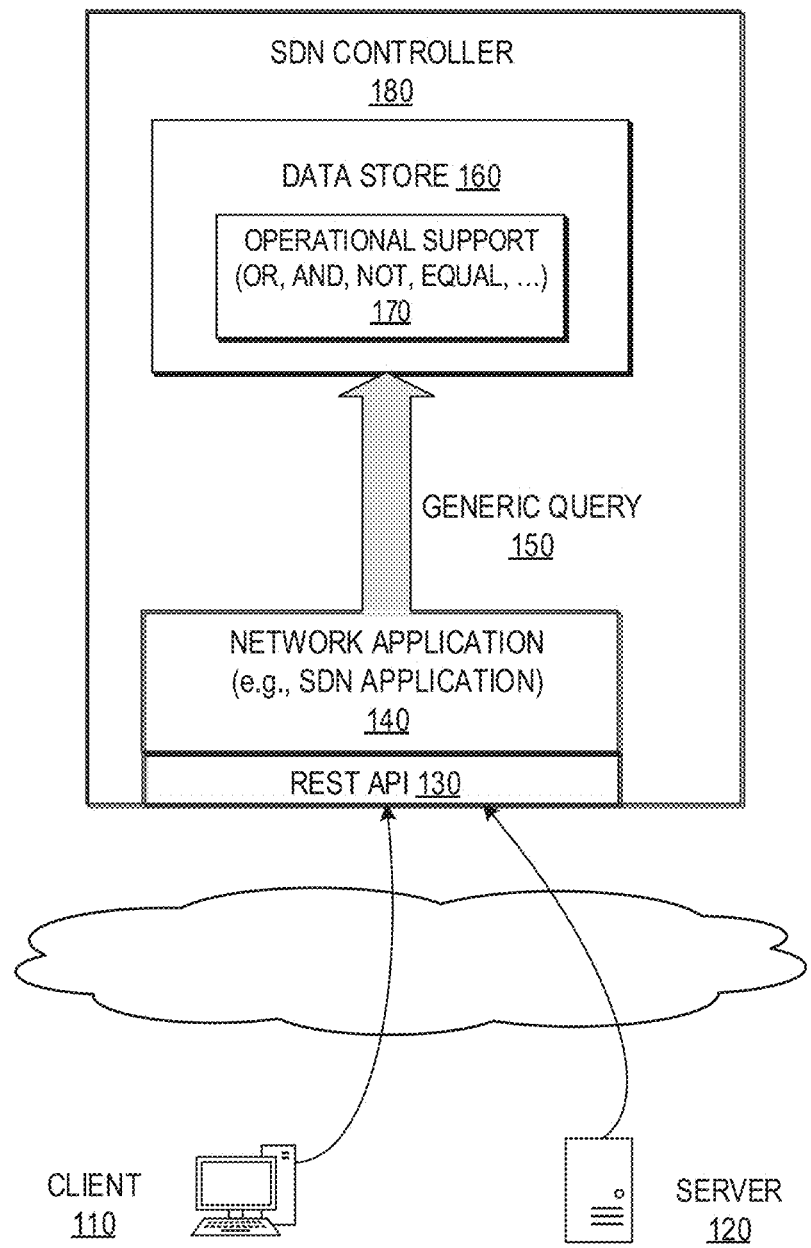
FIG. 1 is a block diagram of an example architecture for using a generic query language for data stores.

FIG. 1 is a block diagram of an example architecture for using a generic query language for data stores. Specifically, FIG. 1 includes a Software-Defined Networking (SDN) Controller 180 that can be connected to a plurality of clients (e.g., Client 110) and/or servers (e.g., Server 120). SDN Controller 180 generally refers to an application in software-defined networking (SDN) that manages flow control to allow intelligent networking. SDN controller 180 may be based on protocols, such as OpenFlow, that allow servers to communicate to network switches on where to send packets.

In the example illustrated in FIG. 1, SDN Controller 180 may include a data store 160 and a network application (e.g., SDN Application) 140. Data store 160 generally refers to a repository to persistently store and manage collections of data, e.g., a database, a file, etc. A database can be a series of bytes that is managed by a database management system (DBMS). A file can be a series of bytes that is managed by a file system. In addition, data store 160 may be used by cloud storage systems for abstracting collections of data inside their respective applications. Therefore, data store 160 can refer to a broad class of storage systems including, but not limited to, simple files (e.g., a spreadsheet), file systems, email storage systems (both server and client systems), relational databases (e.g., SQL databases), non-relational databases (e.g., NoSQL), object-oriented databases, key-value databases, distributed data storages, directory services, virtual machines, etc.

Regardless of the implementations of data store 160, generic query 150 can be generated using a generic query language as defined in the present disclosure as long as data store 160 provides operational support 170 compatible with the generic query language, such as, the support for the operations of OR, AND, NOT, EQUAL, etc.

Network Application 140 may provide a REST API 130 to the plurality of clients and/or servers, such that the plurality of clients and/or servers can generate a generic query 150 to data store 160.

Note that, even though data store 160 is illustrated as a part of SDN Controller 180 in FIG. 1, data store 160 may reside anywhere in the network so long as it has connectivity to the plurality of clients and/or servers. Also, network application 140 can be implemented without a SDN framework.

In the following sections, first, a generic query language is defined herein. Then, a number of example queries are provided for illustration purposes only. Finally, possible ways of storing in a key-value data store are introduced.

Language Description

The example generic query language according to the present disclosure allows grouping by using OR/AND operands, using NOT operand and parenthesis to create possible variations of logical queries. Boolean algebra can be functionally complete with three OR, AND, and NOT operands. In other words, other logical operations could be expressed by using the OR, AND, and NOT operations. Although there may be even smaller sets with one or two cardinality, these three operands were chosen because most data stores provide some ways to support them.

Moreover, this example generic query language can be easily used as query value in the URI query parameter. Detailed information about query parameter in URI could be found in IETF RFC 3986 (URI Generic Syntax), which are incorporated herein in its entirety. In addition, the example generic query language is context free, which allows the use of Backus-Naur form (BNF) notation to describe its grammar and parses queries by using regular expressions.

Table 1 below illustrates the definition of the generic query language.

TABLE 1

Example Generic Query Language Description

Query :: = NotOperand (Query) B
B :: = Operand Query
Operand :: = or | and
Query :: = Expression
B :: = epsilon(empty)
Expression :: = #AllowedAttributeNames #AllowedOperations #Values
Values :: == SingleValueRemainValues
RemainValues :: = ValueOperand SingleValue RemainValues
RemainValues :: = epsilon(empty)
ValueOperand :: = , | &
SingleValue :: = NotOperand AvailableValues
NotOperand :: = ! | epsilon(empty)

As shown in Table 1, a query constructed using the generic query language defined in Table 1 may include multiple queries connected by an operand. Each of the multiple queries can be an expression, which generally takes the form of a first hash tag followed by AllowedAttributeNames, then a second hash tag followed by AllowedOperations, and then a third hash tag followed by a plurality of Values. Therefore, the generic query language herein allows a single query to include multiple expressions.

Here, AllowedAttributeNames may include those alphanumerical values that designer will allow in its attribute names. Whitespaces in BNF maybe ignored in real expressions. AllowedOperations may include operations that data store 160 allows, for example, "equal," "notEqual," "greaterThan," "lessThan," "greaterEqual," "lessEqual," "in," "between," "like," "notLike," "regex," etc.

As used herein, the term "query" generally refers to a precise request for information retrieval with an underlying data store (e.g., database, file, or any other information systems). The query may be constructed using the example generic query language. As used herein, "query language" generally refers to a computer language used to make queries into databases and information systems. The query may also be used as a query string. As used herein, "query string" generally refers to an optional part of a Uniform Resource Identifier (URI) that follows the first question mark in the context of a World Wide Web (WWW). In some examples, the query constructed using the example generic query language may be used as a web search query, which generally refers to a query entered by users into an interface of a search engine to search in a database, a local network, Internet, etc.

The example generic query language allows creating queries for many-to-many relationships in a simple syntax. Hence, results that conventionally are joined together from multiple datasets returned by multiple queries can now be obtained in single dataset in response to a single query using the example generic query language. Additionally, the example generic query language allows more restrictions on possible query formats using simple syntax, and thus eliminates complex nested queries. The following examples are given for illustration purposes only to explain the aforementioned advantage of the example generic query language.

Example Queries

FIGS. 2A-2D are block diagrams illustrating example queries generated using the generic query language for data stores. The example queries in FIGS. 2A-2D and FIGS. 3A-3D use employees and their visited states as an example context. Assuming that an employee can visit multiple states. Therefore, the relationship between the employees set and the states set is a many-to-many relationship, because a particular state could be visited by multiple employees and an employee could visit multiple states.

FIG. 2A shows example information stored in a data store. Note that, in the data store, such information could be stored in multiple tables. In some examples such as in key-value stores, such information may be stored in various data structures. FIG. 2A includes at least three fields, namely, first name 210 of an employee, last name 220 of the employee, and visited states 230 indicating the states that the employee has visited before. For example, according to the information stored in the data store, employee John Thomas has visited the states of Alabama, Nevada, New Jersey, and Nebraska; employee Kevin Thompson has visited the states of Alaska, New Mexico, and South Dakota; employee John Thom berg has visited the states of Nebraska, South Carolina, and New York; employee Johnathan Smith has visited the states of Alabama, New Hampshire, and Ohio; employee Fred Brown has visited the states of Alabama and Oregon; etc.

FIG. 2B illustrates a simple query that searches for employees whose first name is John. Query 240 as a URI query parameter will look like (#FirstName#Equal#John). The string inside parenthesis (e.g., #FirstName#Equal#John) can be referred to as an expression. Here, FirstName is an example of AllowedAttributeNames, Equal is an example of AllowedOperations, and John is an example of Values. When executing query 240, the underlying data store may return a result 250 as shown in FIG. 2B. Result 250 may include employees John Thomas and John Thomberg.

Referring now to FIG. 2C, query 260 searches for employees with first name John or Kevin. Instead of joining two expressions in the form of (#FirstName#equal#John) or (#FirstName#equal#Kevin), the example generic query language herein allows query 260 to be written in the form of a single expression (#FirstName#Equal#John, Kevin). Here, comma (,) in a values represents a logical operand "OR."

With a conventional query including two expressions, the underlying data store will execute the first expression (#FirstName#equal#John) to obtain a first resulting dataset that includes employees whose first name equals to John (e.g., John Thomas, John Thomberg), and then execute the second expression (#FirstName#equal#Kevin) to obtain a second resulting dataset that includes employees whose first name equals to Kevin (e.g., Kevin Thompson). Next, the data store will combine the first resulting dataset and the second resulting dataset to obtain the response to the query (e.g., John Thomas, John Thomberg, Kevin Thompson). It is important to note that the data stores have built-in operational support for OR, EQUAL, etc. However, because of the limitations of existing query languages, the data store had to perform complex logical operations on the resulting datasets in response to the search query.

Now with the example generic query language herein, the data store can receive a query including multiple values in a single expression, e.g., (#FirstName#Equal#John, Kevin), and return results 270 in a single dataset (e.g., John Thomas, John Thomberg, Kevin Thompson).

Referring now to FIG. 2D, query 280 searches for employees with first name John or Kevin and last Name starting with Thom. Here, the use of wildcard characters (e.g., %) or LIKE operation is a capability of the underlying data store. For example, an underscore sign (_) may be used to represent a wildcard for a single character; and, a percentage sign (%) may be used to represent a wildcard for multiple characters in an expression. If the underlying data store does not support wildcard characters, then this capability could be excluded from the language. Both the underscore sign and the percentage sign are examples of AllowedOperations that include any operations allowed by the underlying data store.

The grammar of the example generic query language allows for creating any kind of logical combinations using OR, AND, NOT, and parenthesis, such as, ((expression1) and(expression2))or(!((expression3)or(expression 4))and (expression5)).

FIGS. 3A-3F are block diagrams illustrating more example queries generated using the generic query language for data stores. Specifically, FIGS. 3A-3F describe the use cases of searching for many-to-many relationship. A new operation—the CONTAIN operation—is introduced in these example queries. Although many data stores may not have support for the CONTAIN operation, the CONTAIN operation could be implemented by using other operations and capabilities that are supported in the data store.

FIG. 3A illustrates a query that searches for employees who visited the states of Alabama. Query 310 as a URI query parameter may be constructed as (#visitedStates#Contains#Alabama). With the example generic query language herein, the data store can receive a query including the CONTAIN operation in a single expression, and return results 320 in a single dataset (e.g., John Thomas, Johnathan Smith, Kevin Thompson).

Referring now to FIG. 3B, query 330 searches for employees who have visited the states of Alabama or Nebraska. Query 330 may be constructed as (#VisitedStates#Contains#Alabama,Nebraska). Here, the comma sign (,) in values indicates a logical operand "OR." With a conventional query including two expressions, the underlying data store will execute the first expression (#visitedStates#Contains#Alabama) to obtain a first resulting dataset that includes employees who has visited the state of Alabama (e.g., John Thomas, Johnathan Smith, Fred Brown), and then execute the second expression (#visitedStates#Contains#Nebraska) to obtain a second resulting dataset that includes employees who has visited the state of Nebraska (e.g., John Thomas, John Thomberg). Next, the data store will combine the first resulting dataset and the second resulting dataset to obtain the response to the query (e.g., John Thomas, Johnathan Smith, Kevin Thompson, John Thomberg). This is another example demonstrating that, because of the limitations of existing query languages, the underlying data store had to perform complex logical operations on the resulting datasets in response to the search query.

Now with the example generic query language herein, the data store can receive a query including a CONTAIN operation and multiple values in a single expression, e.g., (#VisitedStates#Contains#Alabama, Nebraska), and return results 340 in a single dataset (e.g., John Thomas, Johnathan Smith, Kevin Thompson, John Thomberg).

Referring now to FIG. 3C, query 350 searches for employees who have visited both Alabama and Nebraska. Query 350 may be constructed as (#VisitedStates#Contains#Alabama&Nebraska). Here, the ampersand sign (&) in values indicates a logical operand "AND." Again, the underlying data store can receive a query including a CONTAIN operation and multiple values in a single expression, e.g., (#VisitedStates#Contains#Alabama&Nebraska), and return results 360 in a single dataset (e.g., John Thomas, John Thomberg).

In FIG. 3D, query 370 searches for employees who have not visited either Alabama or Nebraska. According to the De Morgan Law from Boolean Algebra, an expression can be rewritten as one without parenthesis. For example, not (a or b) is equivalent to not (a) and not (b). Thus, query 370 can be constructed as (#VisitedStates#Contains#!Alabama&!Nebraska). In this example, the underlying data store can receive a query including one comparison operation (e.g., a CONTAIN operation) and multiple logical operations (e.g., NOT operation, AND operation) that are followed by multiple values in a single expression, e.g., (#VisitedStates#Contains#!Alabama&!Nebraska), and return results 375 in a single dataset (e.g., Kevin Thomberg).

Note that, the example generic query language does not allow the use of parenthesis in Values. However, the example generic query language allows the use of multiple logical operations (e.g., "AND," "OR," and "NOT" operations) in a single expression. From Boolean Algebra, it is possible to create any logical expressions with this set of operands without parenthesis using the De Morgan Law.

Referring now to FIG. 3E, query 380 searches for employees who have visited at least a state whose name starts with "New" and such employees have not visited any states whose name starts with "South." Using the example generic query language, query 380 may be constructed as (#VisitedStates#Contains#New %&!South%). Here, the wildcard characters, such as the percentage sign (%), are supported by the capabilities of the underlying data store. In this example, the underlying data store can receive a query including one comparison operation (e.g., a CONTAIN operation), multiple logical operations (e.g., NOT operation, AND operation), along with values including multiple wildcard characters in a single expression, and return results 385 in a single dataset (e.g., John Thomas, Johnathan Smith).

FIG. 3F shows yet another example query using the generic query language. Query 390 searches for employees who have visited exactly a provided list of states. Thus, query 390 may be constructed using the "EQUAL" operation, which is a part of the AllowedOperations supported by the underlying data store. Specifically, query 390 may be constructed as (#VisitedStates#Equal#Alabama&Oregon). In this example, the underlying data store can receive a query including one comparison operation (e.g., an EQUAL operation) followed by multiple values in a single expression, and return results 395 in a single dataset (e.g., Fred Brown).

As seen in the above examples, the example generic query language described herein allows for creation of complex queries in a simplified manner to search for many-to-many relationships combined with search in other attributes. The queries constructed using the example generic query language can easily be integrated into a URI as a query parameter. An example URI query parameter may look like this: http://example.com/?(#visitedstates#equal#Alabama&oregon). In the example generic query language, reserved characters, such as, comma (,), hash tag (#), ampersand (&), etc. can be encoded in the URI string. Also, because the percentage sign (%) may be used as an escape character in the URI string, it can be encoded as well if used as a wildcard character.

Processes to Use Generic Query Language for Data Stores

Figure 4:
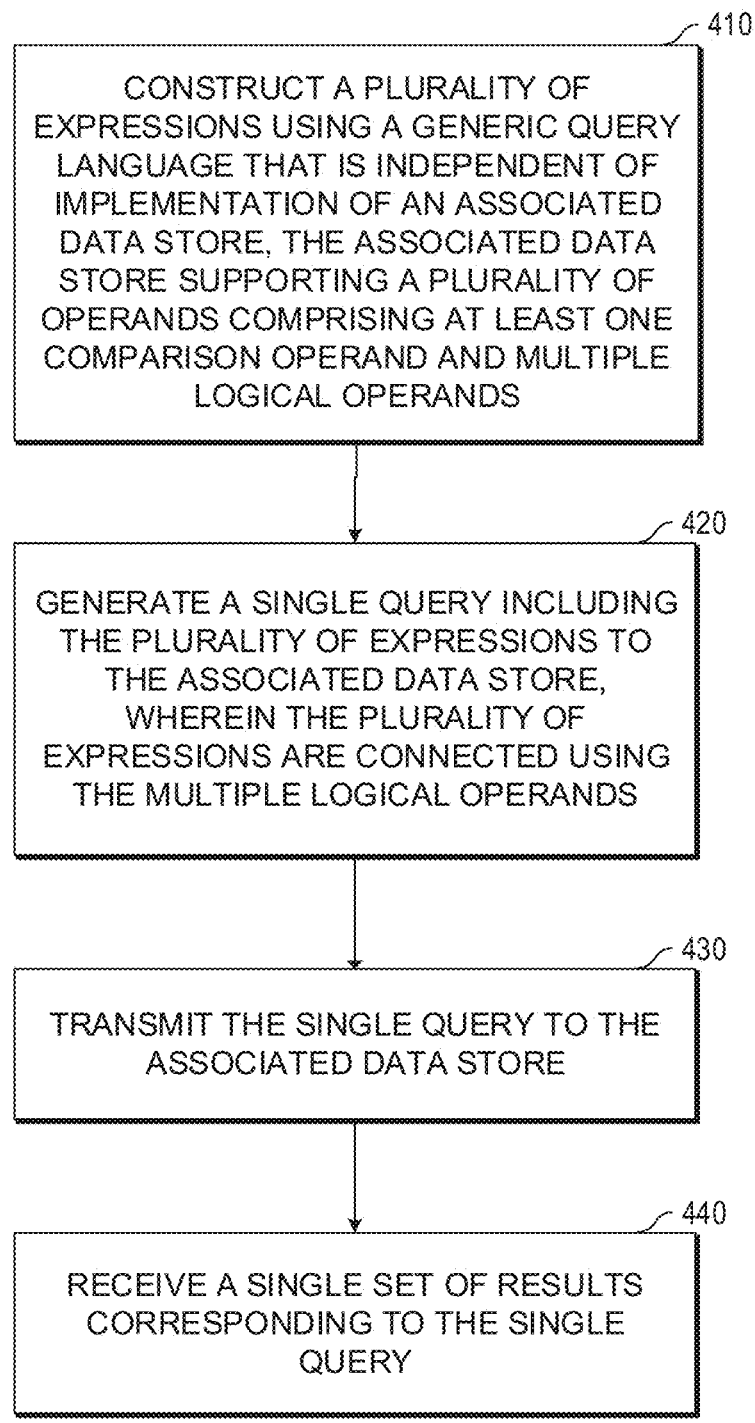
FIG. 4 is a flowchart of an example query process to use the generic query language for data stores.
Figure 5:
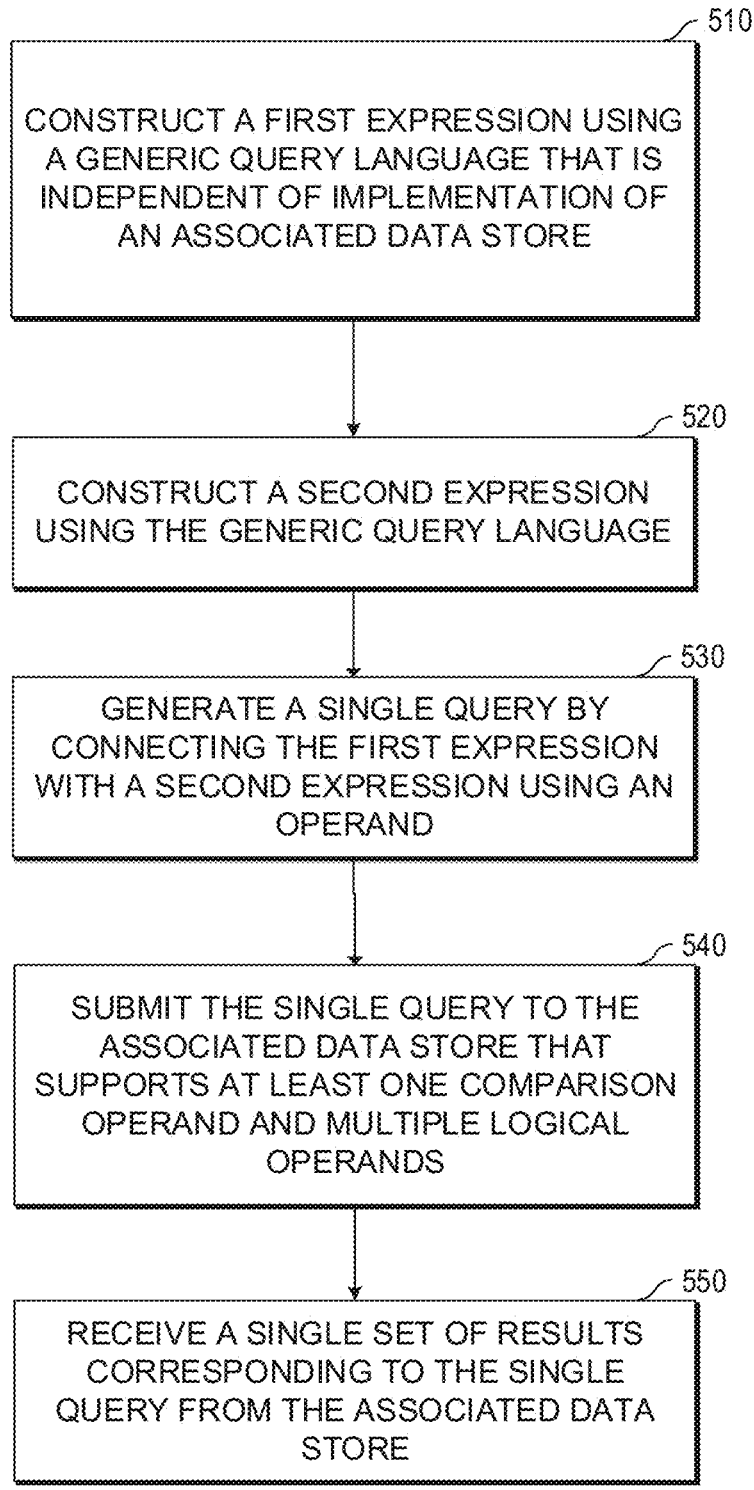
FIG. 5 is a flowchart of an example query process to use the generic query language for data stores.
Figure 6:
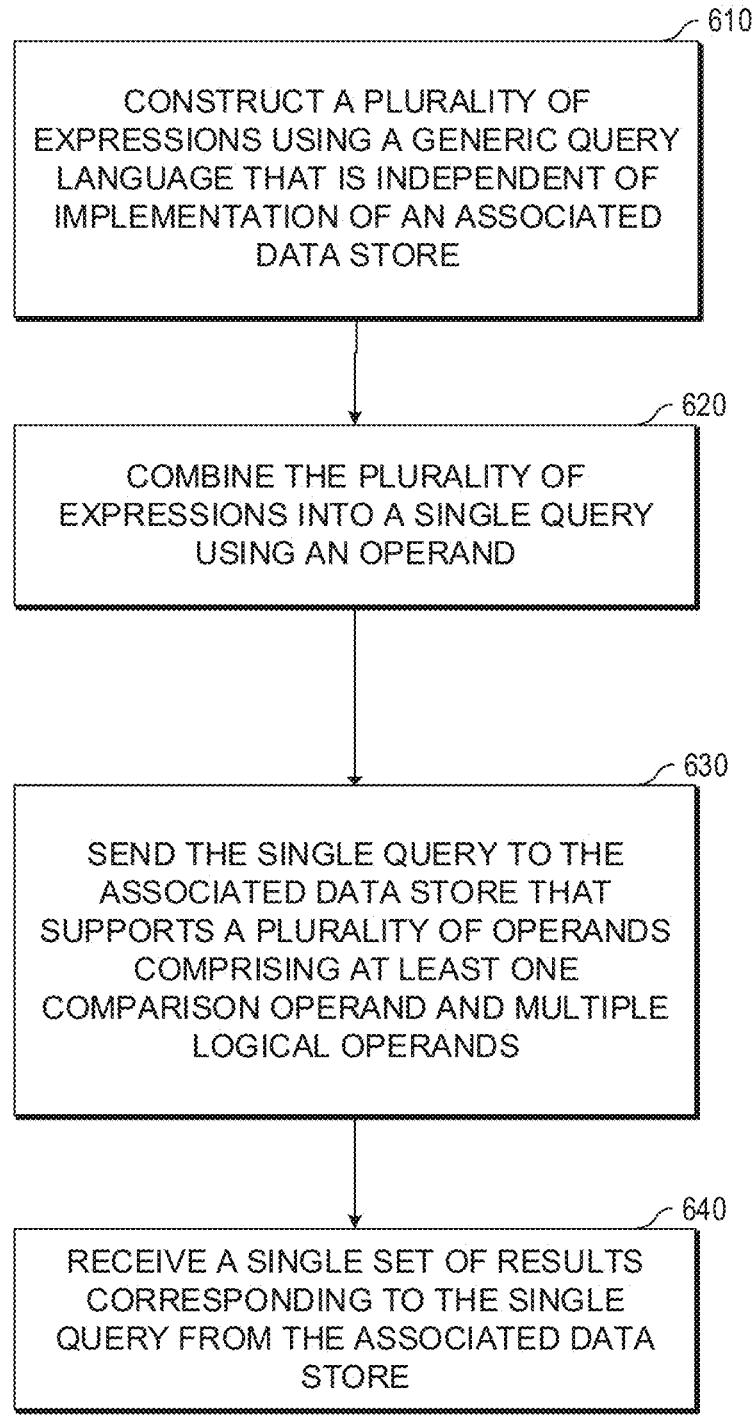
FIG. 6 is a flowchart of an example query process to use the generic query language for data stores.

In discussing FIGS. 4-6, references may be made to the components in FIGS. 1-3 to provide contextual examples. In one implementation, network application 140 described in FIG. 1 executes operations 410-440, 510-550, and 610-640 to construct a query using the generic query language for data stores. Further, although FIGS. 4-6 are described as implemented by a computing device, it may be executed on other suitable devices or components. For example, FIGS. 4-6 may be implemented in the form of executable instructions on a machine-readable storage medium 720 as in FIG. 7.

FIG. 4 is a flowchart of an example process to use the generic query language for data stores. First, a computing device may construct a plurality of expressions using a generic query language that is independent of implementation of an associated data store (operation 410). Here, the associated data store may support a plurality of operands that include at least one comparison operand and multiple logical operands. Then, the computing device can generate a single query including the plurality of expressions to the associated data store, wherein the plurality of expressions are connected using the multiple logical operands (operation 420). Note that each expression in the single query may include multiple values separated by the multiple logical operands. This allows execution of a single query to accomplish what has been conventionally obtained through the aggregation of resulting datasets from multiple individual queries. Next, the computing device can transmit the single query to the associated data store (operation 430). Finally, the computing device can receive a single set of results corresponding to the single query (operation 440).

FIG. 5 is a flowchart of an example process to use the generic query language for data stores. First, a computing device may construct a first expression using a generic query language that is independent of implementation of an associated data store (operation 510). Similarly, the associated data store here may support a plurality of operands that include at least one comparison operand and multiple logical operands. Then, the computing device can construct a second expression using the generic query language (operation 520). Note that each expression in the single query may include multiple values separated by the multiple logical operands. Next, the computing device can generate a single query by connecting the first expression with a second expression using an operand (operation 530). This allows execution of a single query to accomplish what has been conventionally obtained through the aggregation of resulting datasets from multiple individual queries. Subsequently, the computing device can submit the single query to the associated data store that supports at least one comparison operand and multiple logical operands (operation 540). Finally, the computing device can receive a single set of results corresponding to the single query from the associated data store (operation 550).

FIG. 6 is a flowchart of an example process to use the generic query language for data stores. First, a computing device may construct a plurality of expressions using a generic query language that is independent of implementation of an associated data store (operation 610). Then, the computing device can combine the plurality of expressions into a single query using an operand (operation 620). Note that each expression in the single query may include multiple values separated by the multiple logical operands. This allows execution of a single query to accomplish what has been conventionally obtained through the aggregation of resulting datasets from multiple individual queries. Next, the computing device can send the single query to the associated data store that supports a plurality of operands comprising at least one comparison operand and multiple logical operands (operation 630). Finally, the computing device can receive a single set of results corresponding to the single query from the associated data store (operation 640).

In some examples, the one comparison operand supported by the associated data store may include an EQUAL operand, a NOT EQUAL operand, a GREATER THAN operand, a LESS THAN operand, etc. In some examples, the multiple logical operands supported by the associated data store may include an OR operand, an AND operand, and a NOT operand.

Furthermore, each of the plurality of expressions can include an attribute name, an operation, and a plurality of values. Each of the attribute name, the operation, and the plurality of values may be preceded by a special character. In some examples, the plurality of values are separated by a plurality of value operands. For example, the plurality of value operands may include a comma indicating an OR operation, or an ampersand indicating an AND operation.

In some examples, the associated data store may include a text data file, a spreadsheet file, a file system, an email storage system, a relational database, a non-relational database, an object-oriented database, a distributed data storage, a directory service, or a virtual machine. When the associated data store includes multiple components, each component of the associated data store may support the one comparison operand and the multiple logical operands.

In some examples, the single query is used as a uniform resource identifier (URI) query parameter. Specifically, reserved characters can be encoded in the URI string. Such reserved characters may include, but are not limited to, a comma sign (,) indicating the OR operand, a hash tag sign (#) introducing a name of attribute and/or operand or a value, an ampersand sign (&) indicating the AND operand, an exclamation sign (!) indicating the NOT operand, a percentage sign (%) indicating a wildcard for multiple characters, an underline sign (_) indicating a wildcard for a single character, etc.

Computing Device to Use Generic Query Language for Data Stores

Figure 7:
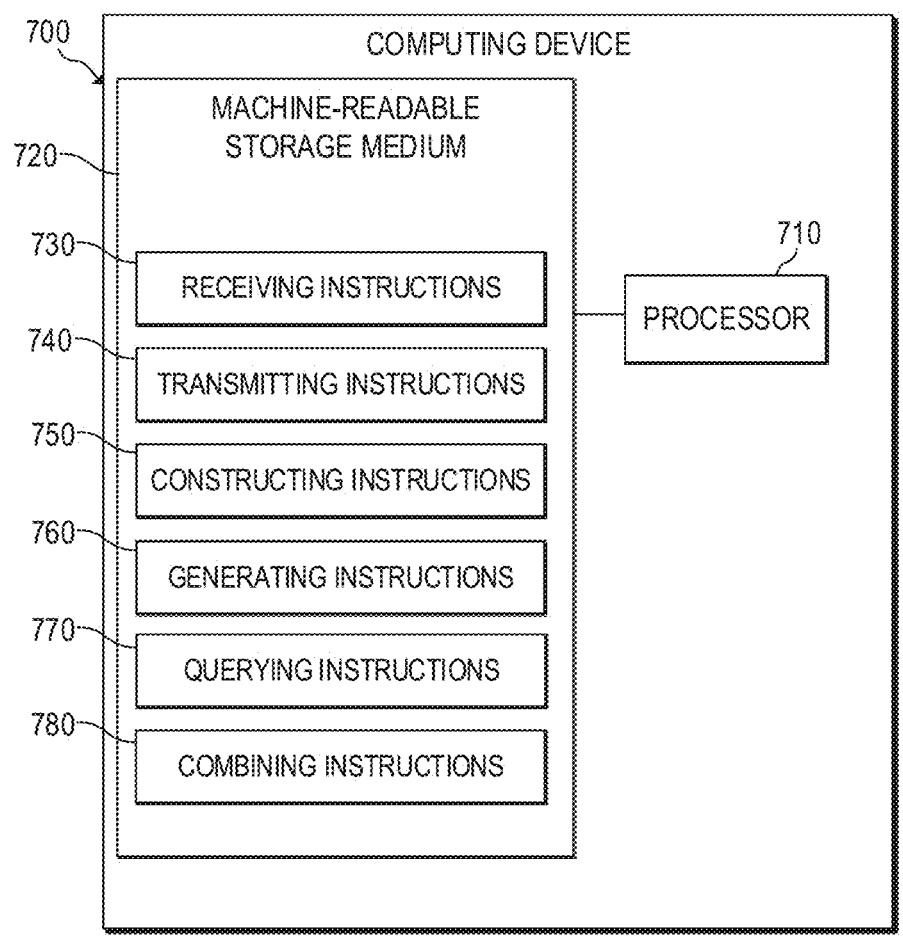
FIG. 7 is a block diagram of an example network device to generate queries using the generic query language for data stores.

FIG. 7 is a block diagram of an example computing device with at least one processor 710 to execute instructions 730-780 within a machine-readable storage medium 720 to construct a query using the generic query language for data stores. As used herein, "computing device" or "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

Although the computing device 700 includes at least one processor 710 and machine-readable storage medium 720, it may also include other components that would be suitable to one skilled in the art. For example, computing device 700 may include an additional processing component and/or storage. In another implementation, the computing device executes instructions 730-780. Computing device 700 is an electronic device with the at least one processor 710 capable of executing instructions 730-780, and as such implementations of computing device 700 include a mobile device, server, data center, networking device, client device, computer, or other type of electronic device capable of executing instructions 730-780. The instructions 730-780 may be implemented as methods, functions, operations, and other processes implemented as machine-readable instructions stored on the storage medium 720, which may be non-transitory, such as hardware storage devices (e.g., random access memory (RAM), read only memory (ROM), erasable programmable ROM, electrically erasable ROM, hard drives, and flash memory).

The at least one processor 710 may fetch, decode, and execute instructions 730-780 to construct a query using the generic query language for data stores. Specifically, the at least one processor 710 executes instructions 730-780 to: construct a plurality of expressions using a generic query language that is independent of implementation of an associated data store; generate a single query including the plurality of expressions to the associated data store; transmit the single query to the associated data store; construct a first expression using a generic query language that is independent of implementation of an associated data store; construct a second expression using the generic query language; generate a single query by connecting the first expression with a second expression using an operand; submit the single query to the associated data store that supports at least one comparison operand and multiple logical operands; construct a plurality of expressions using a generic query language that is independent of implementation of an associated data store; combine the plurality of expressions into a single query using an operand; send the single query to the associated data store that supports a plurality of operands comprising at least one comparison operand and multiple logical operands; receive a single set of results corresponding to the single query from the associated data store; etc.

The machine-readable storage medium 720 includes instructions 730-780 for the processor 710 to fetch, decode, and execute. In another example, the machine-readable storage medium 720 may be an electronic, magnetic, optical, memory, storage, flash-drive, or other physical device that contains or stores executable instructions. Thus, the machine-readable storage medium 720 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 720 may include an application and/or firmware which can be utilized independently and/or in conjunction with the at least one processor 710 to fetch, decode, and/or execute instructions of the machine-readable storage medium 720. The application and/ or firmware may be stored on the machine-readable storage medium 720 and/or stored on another location of the network device 700.

We claim:

1. A method comprising:
    constructing, by a computing device, a plurality of expressions using a generic query language that is independent of implementation of an associated data store, the associated data store supporting a plurality of operands comprising at least one comparison operand and multiple logical operands, wherein a respective expression of the plurality of expressions comprises a first hash tag followed by an attribute name, a second hash tag followed by an operand from the plurality of operands, and a third hash tag followed by a plurality of values associated with the attribute name, and wherein adjacent values from the plurality of values following the third hash tag are joined by one or more value operands supported by the associated data store;
    combining, by the computing device, the plurality of expressions into a single query to the associated data store, wherein combining the plurality of expressions comprises connecting at least two expressions using a logical operand;
    transmitting, by the computing device, the single query to the associated data store; and
    receiving, by the computing device, a single set of results corresponding to the single query.

2. The method of claim 1, wherein the at least one comparison operand supported by the associated data store comprises one of:
    an EQUAL operand, a NOT EQUAL operand, a GREATER THAN operand, and a LESS THAN operand.

3. The method of claim 1, wherein the multiple logical operands supported by the associated data store comprise:
    an OR operand, an AND operand, and a NOT operand.

4. The method of claim 1, wherein the one or more value operands comprise one or more of: a comma indicating an OR operation and an ampersand indicating an AND operation.

5. The method of claim 1, wherein the associated data store comprises at least one of:
    a text data file, a spreadsheet file, a file system, an email storage system, a relational database, a non-relational database, an object-oriented database, a distributed data storage, a directory service, and a virtual machine, each component of the associated data store supporting the one comparison operand and the multiple logical operands.

6. The method of claim 1, wherein the single query is used as a uniform resource identifier (URI) query parameter.

7. A system comprising at least a memory and a processor coupled to the memory, the processor executing instructions stored in the memory to:
    construct a first expression using a generic query language that is independent of implementation of an associated data store, the associated data store supporting a plurality of operands comprising at least one comparison operand and multiple logical operands;
    construct a second expression using the generic query language, wherein each of the first and second expressions comprises a first hash tag followed by an attribute name, a second hash tag followed by an operand from the plurality of operands, and a third hash tag followed by a plurality of values associated with the attribute name, and wherein adjacent values from the plurality of values following the third hash tag are joined by one or more value operands supported by the associated data store;

combine the first expression and the second expression into a single query by connecting the first expression and the seconding expression using a logical operand supported by the associated data store;

submit the single query to the associated data store; and receive a single set of results corresponding to the single query from the associated data store.

8. The system of claim 7, wherein the at least one comparison operand comprises one of:

an EQUAL operand, a NOT EQUAL operand, a GREATER THAN operand, and a LESS THAN operand.

9. The system of claim 7, wherein the multiple logical operands comprise:

an OR operand, an AND operand, and a NOT operand.

10. The system of claim 7, wherein the one or more value operands comprise one or more of: a comma indicating an OR operation and an ampersand indicating an AND operation.

11. The system of claim 7, wherein the query language uses Backus-Naur form notation to describe grammar rules and parses the single query using regular expressions.

12. The system of claim 7, wherein the single query is used as a uniform resource identifier (URI) query parameter.

13. A non-transitory machine-readable storage medium encoded with instructions executable by at least one processor of a network device, the machine-readable storage medium comprising instructions to:

construct a plurality of expressions using a generic query language that is independent of implementation of an associated data store, the associated data store supporting a plurality of operands comprising at least one comparison operand and multiple logical operands, wherein a respective expression of the plurality of expressions comprises a first hash tag followed by an attribute name, a second hash followed by an operand from the plurality of operands, and a third hash tag followed by a plurality of values associated with the attribute name, and wherein adjacent values from the plurality of values following the third hash tag are joined by one or more value operands supported by the associated data store;

combine the plurality of expressions into a single query to the associated data store, wherein combining the plurality of expressions comprises connecting at least two expressions using a logical operand;

send the single query to the associated data store; and receive a single set of results corresponding to the single query from the associated data store.

14. The non-transitory machine-readable storage medium of claim 13, wherein the at least one comparison operand comprises one of:

an EQUAL operand, a NOT EQUAL operand, a GREATER THAN operand, and a LESS THAN operand, and wherein the multiple logical operands comprise:

an OR operand, an AND operand, and a NOT operand.

15. The non-transitory machine-readable storage medium of claim 13, wherein the one or more value operands comprise one or more of: a comma indicating an OR operation and an ampersand indicating an AND operation.

* * * * *